(12) United States Patent
Susnjara

(10) Patent No.: US 9,956,657 B2
(45) Date of Patent: May 1, 2018

(54) METHOD OF FORMING THREE-DIMENSIONAL DECORATIVE ITEMS

(71) Applicant: Thermwood Corporation, Dale, IN (US)

(72) Inventor: Kenneth J. Susnjara, Birdseye, IN (US)

(73) Assignee: THERMWOOD CORPORATION, Dale, IN (US)

( * ) Notice: Subject to any disclaimer, the term of this patent is extended or adjusted under 35 U.S.C. 154(b) by 0 days. days.

(21) Appl. No.: 15/226,471

(22) Filed: Aug. 2, 2016

(65) Prior Publication Data

US 2018/0036847 A1 Feb. 8, 2018

(51) Int. Cl.
| | | |
|---|---|---|
| *B23Q 3/08* | (2006.01) | |
| *B23C 1/06* | (2006.01) | |
| *B23C 1/00* | (2006.01) | |
| *B27M 3/12* | (2006.01) | |
| *B23Q 35/04* | (2006.01) | |

(52) U.S. Cl.
CPC .............. *B23Q 3/088* (2013.01); *B23C 1/002* (2013.01); *B27M 3/12* (2013.01); *B23C 1/06* (2013.01); *B23Q 35/04* (2013.01); *Y10T 409/303808* (2015.01)

(58) Field of Classification Search
CPC ...... B23Q 35/04; B23Q 35/06; B23Q 35/101; B23Q 35/105; B23Q 35/109; B23Q 35/42; B23Q 35/46; B23Q 3/088; B23Q 3/10; B23Q 3/105; B23Q 1/032; B23C 1/06; B23C 9/00; Y10T 409/303752; Y10T 409/303808; Y10T 409/307; Y10T 409/307448; Y10T 409/30868; Y10T 409/300896; Y10T 409/307336
USPC ............................................. 269/296, 289 R
See application file for complete search history.

(56) References Cited

U.S. PATENT DOCUMENTS

| | | | | | |
|---|---|---|---|---|---|
| 2,454,992 A | * | 11/1948 | Coleman | ................... | B27B 5/08 144/1.1 |
| 3,888,161 A | * | 6/1975 | Baudermann | ............. | B23C 3/34 144/85 |
| 4,158,987 A | * | 6/1979 | Smith | .................... | B26D 7/025 144/135.2 |
| 4,382,728 A | * | 5/1983 | Anderson | ............... | B23C 1/002 144/135.2 |
| 4,494,433 A | * | 1/1985 | Gerber | ................... | B08B 15/00 83/100 |

(Continued)

FOREIGN PATENT DOCUMENTS

| | | | | | |
|---|---|---|---|---|---|
| DE | 102012212391 A1 | * | 1/2014 | ............... | B23Q 3/02 |
| EP | 2186611 A2 | | 5/2010 | | |
| FR | 2935926 A1 | | 3/2010 | | |

*Primary Examiner* — Nicole N Ramos
(74) *Attorney, Agent, or Firm* — Bookoff McAndrews, PLLC

(57) ABSTRACT

Aspects of the present disclosure relate to methods for fabricating components, for example, 3D decorative items. In an embodiment, a method including positioning a spoil board on a worktable of a computer numeric control (CNC) machine; operating the CNC machine in a first mode to create an outline in the spoil board; positioning a first workpiece on the spoil board and over at least a portion of the outline; and operating the CNC machine in a second mode to cut into a portion of the first workpiece.

18 Claims, 3 Drawing Sheets

(56) References Cited

U.S. PATENT DOCUMENTS

| | | | | | |
|---|---|---|---|---|---|
| 4,518,288 | A | * | 5/1985 | Cilindro | B22C 7/02 106/38.8 |
| 4,528,878 | A | * | 7/1985 | Gerber | B25B 11/005 83/100 |
| 5,071,503 | A | * | 12/1991 | Berman | B23P 15/246 156/250 |
| 5,141,212 | A | * | 8/1992 | Beeding | B25B 11/005 248/363 |
| 5,375,951 | A | * | 12/1994 | Veale | B23Q 1/032 144/24.05 |
| 5,493,767 | A | * | 2/1996 | Susnjara | B23Q 3/069 144/135.2 |
| 5,775,395 | A | | 7/1998 | Wilkins | |
| 5,953,232 | A | * | 9/1999 | Blaimschein | B26D 5/00 382/111 |
| 6,665,580 | B1 | * | 12/2003 | Susnjara | G05B 19/404 318/568.1 |
| 6,830,416 | B2 | * | 12/2004 | Susnjara | B23Q 17/002 144/278.3 |
| 6,902,360 | B2 | * | 6/2005 | Meece | B23C 3/00 269/7 |
| 7,141,191 | B2 | * | 11/2006 | Engwall | B29C 70/545 264/139 |
| 7,244,082 | B2 | * | 7/2007 | Metzner | B25B 11/005 409/132 |
| 7,467,449 | B1 | * | 12/2008 | Lee | B23B 39/06 29/26 A |
| 2012/0063862 | A1 | * | 3/2012 | Epplin | B23Q 3/088 409/131 |

* cited by examiner

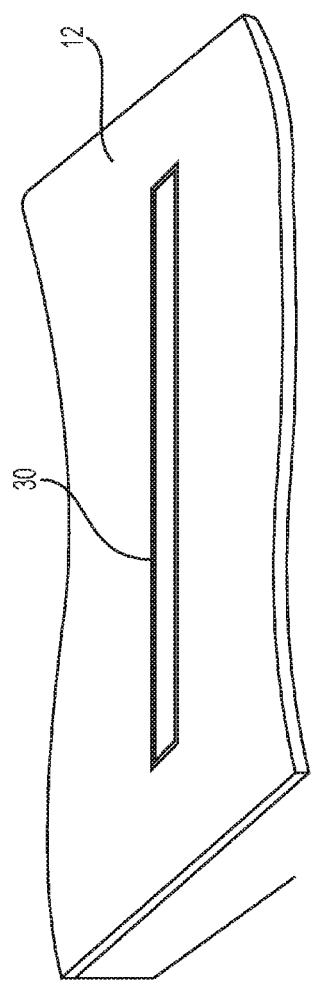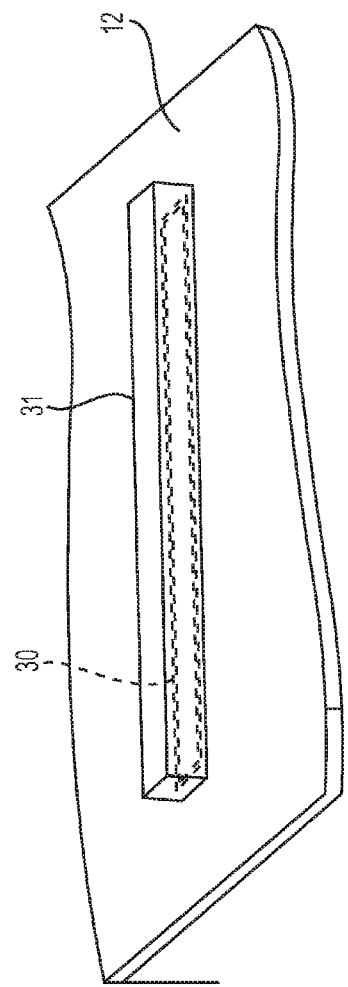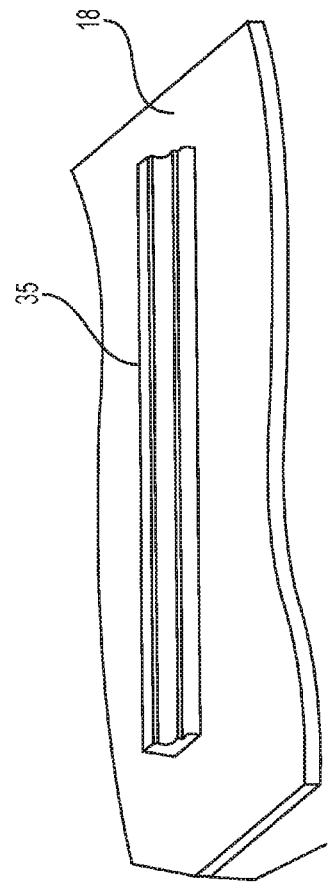

METHOD OF FORMING THREE-DIMENSIONAL DECORATIVE ITEMS

TECHNICAL FIELD

Aspects of the present disclosure relate to methods for fabricating components. In some aspects, the present disclosure relates to a method of forming three-dimensional ("3D") components, and more particularly, to methods of forming various decorative building and furniture items in either small or large quantities, expediently and economically, by personnel of limited technical background and skill.

BACKGROUND

In the construction of building structures and the manufacture of accessories and furniture for such structures, it often is required or desirable to provide various decorative items, such as moldings, rails and the like, having a variety of configurations. Generally, such items have been required in limited or multiple quantities, and have required the use of craftsmen of various skills. Typically, such items have been produced manually by skilled craftsmen in comparatively limited numbers or produced with machinery by skilled personnel in larger numbers. In either scenario, production has been limited and/or costly. Accordingly, the present disclosure provides methods of producing a variety of decorative building and furniture items in either limited or large quantities, expediently and economically, by person of limited technical background and skill.

Another object of the present disclosure is to provide a method of producing decorative items of various configurations for use with building structures and/or furniture.

A still further object of the disclosure is to provide a method of producing a variety of decorative elements of various configurations and in a variety of numbers by the use of a programmable machine (e.g. a computer numeric control ("CNC") machine).

SUMMARY

Aspects of the present disclosure relate to, among other things, methods for fabricating components, and, specifically, methods for manufacturing 3D decorative items. Each of the aspects disclosed herein may include one or more of the features described in connection with any of the other disclosed aspects.

In one embodiment, a method for fabricating components according to the present disclosure includes the steps of inputting a program into a CNC machine, wherein the CNC machine is provided with a worktable, a spoil board mounted on the worktable, and a control system for guiding at least one cutting tool along x, y and z-axes relative to the worktable, and wherein the program is configured to perform a first mode to guide a first cutting tool to form a groove in the spoil board, the groove defining a perimeter encompassing an area corresponding to a configuration of a support surface of a workpiece, and wherein the program is configured to perform a second mode to guide the cutting tool along the axes to form a selected configuration on the workpiece mounted on the spoil board with the support surface thereof seated on at least the area disposed within the groove; operating the machine in the first mode to form the groove in the spoil board; positioning a workpiece on the spoil board with the support surface thereof seated on at least the area disposed within the groove; and operating the machine in the second mode to form the selected configuration of the workpiece.

In another embodiment, a workpiece is releasably mounted on a spoil board, preferably by application of a vacuum to a porous spoil board. Tools of various cutting bit profiles are used and these tools are guided along rectilinear and curved cutting paths in configuring the workpiece.

Further aspects of the present disclosure relate to methods for fabricating components, for example, 3D decorative items. In an embodiment, a method including positioning a spoil board on a worktable of a CNC machine; operating the CNC machine in a first mode to create an outline in the spoil board; positioning a first workpiece on the spoil board and over at least a portion of the outline; and operating the CNC machine in a second mode to cut into a portion of the first workpiece.

In various embodiments, the disclosed methods may include one or more of the following features: positioning the first workpiece on the spoil board includes releasably securing the first workpiece to the spoil board; the first workpiece is releasably secured to the spoil board by application of a vacuum; the worktable includes a plenum, wherein the spoil board is positioned over the plenum; operating the CNC machine in a first mode includes executing a first set of instructions configured to move a first cutting tool relative to the spoil board; operating the CNC machine in a second mode includes executing a second set of instructions to move a second cutting tool relative to the first workpiece; the first and second cutting tools are different; the second cutting tool is moved relative to the workpiece in X, Y, and Z directions; removing the first workpiece from the spoil board, positioning a second workpiece on the spoil board, wherein the second workpiece is positioned over at least a portion of the grooved outline, operating the CNC machine in the second mode to cut into a portion of the second workpiece; and the outline is a groove formed in the spoil board.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 3 is an enlarged fragmentary view of a portion of an exemplary spoil board mounted on the machine shown in FIG. 1, illustrating a grooved outline having been formed therein;

FIG. 4 is a view similar to the view shown in FIG. 3, illustrating a subsequent component of the claimed method, providing for the loading of a workpiece on the spoil board overlapping the confines of the grooved outline provided in the spoil board; and FIG. 5 is a view similar to the view shown in FIGS. 2, 3 and 4, illustrating a finished item formed from the workpiece shown in FIG. 4.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

DETAILED DESCRIPTION

The present disclosure is drawn to, among other things, a method of forming 3D items via, e.g. a computer-programmable CNC routing machine to form various decorative building, ornamental and/or furniture items in either small or large quantities, expediently and economically, by personnel having limited technical background and skill.

Figure 1:
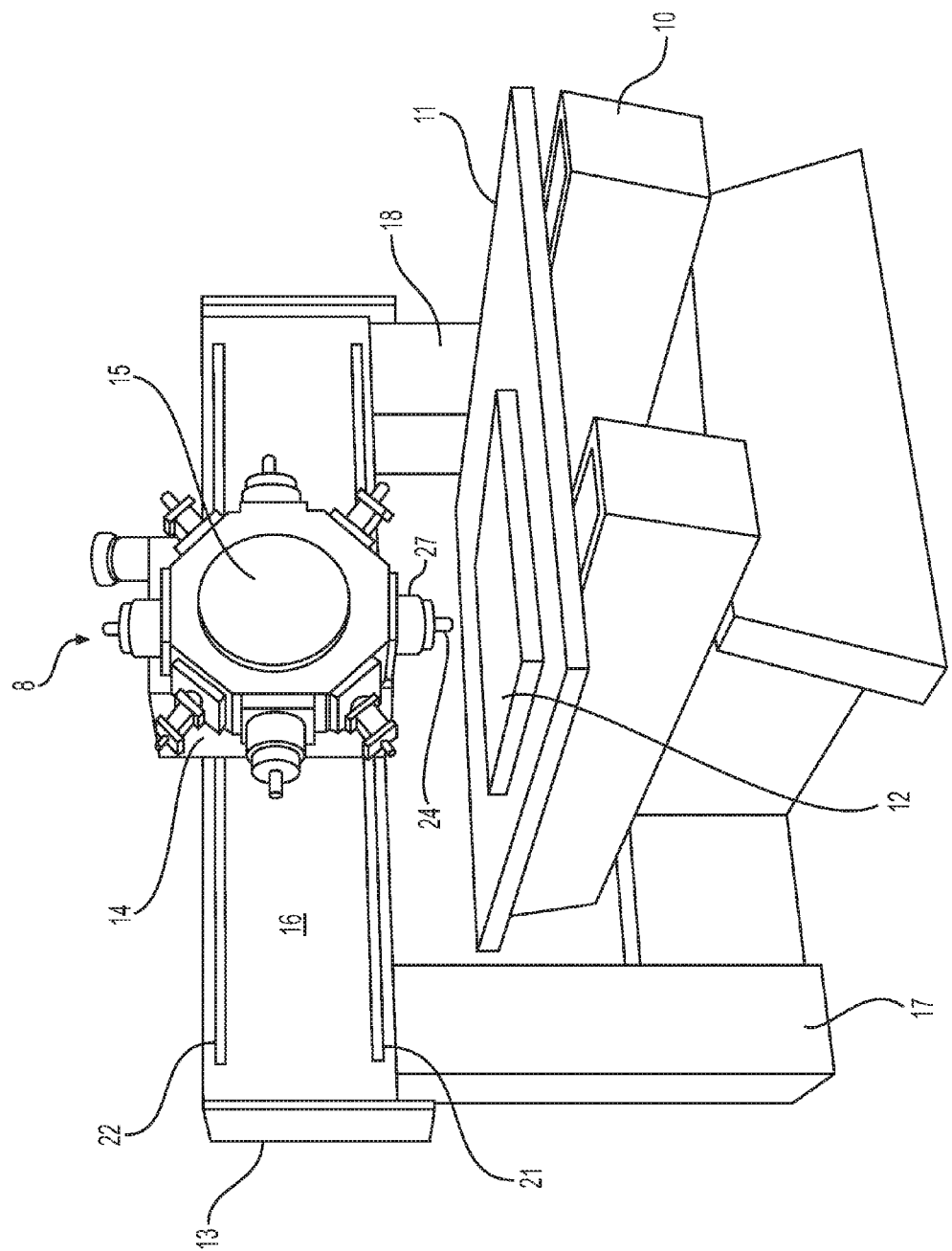
FIG. 1 is a perspective view of an exemplary CNC machine operable pursuant to a manufacturing process to form 3D components, according to an aspect of the present disclosure.

Referring to FIG. 1 of the drawings, there is illustrated an exemplary CNC router machine 8 operable pursuant to the manufacturing processes disclosed herein to form 3D items, as described in greater detail below. The CNC router 8 is of a conventional construction including a base structure 10, a worktable 11 mounted on the base structure 10, a spoil board 12 mounted on the worktable, a gantry 13, a tool carriage 14 mounted on the gantry 13, and a tool holder 15 mounted on the tool carriage 14. The tool holder 15 may include a variety of different cutting or other manufacturing tools. Cutting tool 24, as shown in FIG. 1, is identified for illustrative purposes. In other embodiments, tool holder 15 may be configured to operably retain different cutting tools of various cutting profiles. Tool holder 15 is not limited to the shape, size, geometry and orientation of the tool holder illustrated in FIG. 1. Various other embodiments of tool holder 15 are capable of being attached to tool carriage 14.

Worktable 11 may be provided with a recess in the upper side thereof. The recess may be closed by spoil board 12 positioned over the recess. In some embodiments, the spoil board 12 may be formed of a porous material so as to function as a plenum operatively connected to a vacuum pump provided on the CNC router 8 or operably coupled to CNC router 8.

The spoil board 12 may be releasably secured to a workpiece 31 (shown in FIGS. 3-5) via any suitable means known in the art. In one embodiment, a negative pressure may be applied to the spoil board 12 so as to releasably adhere the workpiece 31 seated on the spoil board 12 above the plenum. In other embodiments, the spoil board 12 may be releasably attached to the workpiece 31 using other means known to a person having ordinary skill in the art. For example, the workpiece 31 may be secured to the spoil board 12 via a temporary and/or reusable adhesive film.

Gantry 13 is of a conventional construction including a cross beam 16 provided with a pair of depending, transversely spaced leg portions 17 and 18. Leg portions 17 and 18 are supported on longitudinally disposed guide rails (not shown in FIG. 1). Leg portions 17 and 18 may be displaced along elongated threaded members (not shown), which may be supported on the sides of the base structure 10 and are driven by servomotors (not shown) to displace the gantry 13 longitudinally or along an x-axis. Carriage 14 may be supported on a set of transversely disposed guide rails (not shown), and is displaceable by means of a threaded member (not shown) supported on the gantry 13. The guide rails may be threaded through the carriage 14 and driven by a servomotor (not shown) transversely and parallel to the cross beam 16, or along a y-axis. Tool holder 15 is similarly supported by a set of vertically disposed guide rails (internal to tool holder 15, and not shown in FIG. 1), and is displaceable vertically or along a z-axis by either a threaded member or a rack and pinion assembly, by means of, e.g., a servomotor. Tool holder 15 also is provided with a depending tool guide 27, as shown in FIG. 1. Depending tool guide 27 is configured to receive the cutting tool 24. The several servomotors described above may be operated by a computer (not shown) based on programs inputted into the computer and command signals inputted into a control system (not shown) of the CNC router 8. Ultimately, the CNC router 8 is operable based on the input of a program into the computer and the input of command signals into the control system of the router 8. The computer is in electrical communication with the control system of the CNC router 8 so as to send command signal data from the computer to the control system of the CNC router 8.

The control system may be operatively connected to the CNC router 8 for displacing cutting tool 24 along a longitudinal line of travel or an x-axis, a transverse line of travel or a y-axis, and a vertical line of travel or a z-axis, in accordance with the program inputted or loaded into the control system of the CNC router 8 for forming a 3D decorative building and/or furniture item, in either small or large quantities.

The program inputted into the computer resulting in operation of the router may include multiple modes of operation. In some embodiments, for example, a first mode may provide a routine guiding function to guide cutting tool 24 along x and y axes to form a grooved outline 30 on the spoil board 12, as illustrated in FIG. 3. The grooved outline 30 may denote an area on spoil board 12 on which a workpiece 31 to be machined is to be positioned on the spoil board 12, as shown in FIG. 4. The program inputted into the computer also may include a second mode of operation. For example, the second mode may provide a routine guiding function to guide cutting tool 24 along x, y and z-axes to form a selected configuration on a workpiece 31 positioned on the spoil board 12 within the area delineated by grooved outline 30. In some embodiments, the second mode may utilize a cutting tool different from cutting tool 24. In such embodiments, the computer of CNC router 8 may be configured to rotate tool holder 15 so as to position another tool in the position of tool 24 depicted in FIG. 1.

Figure 2:
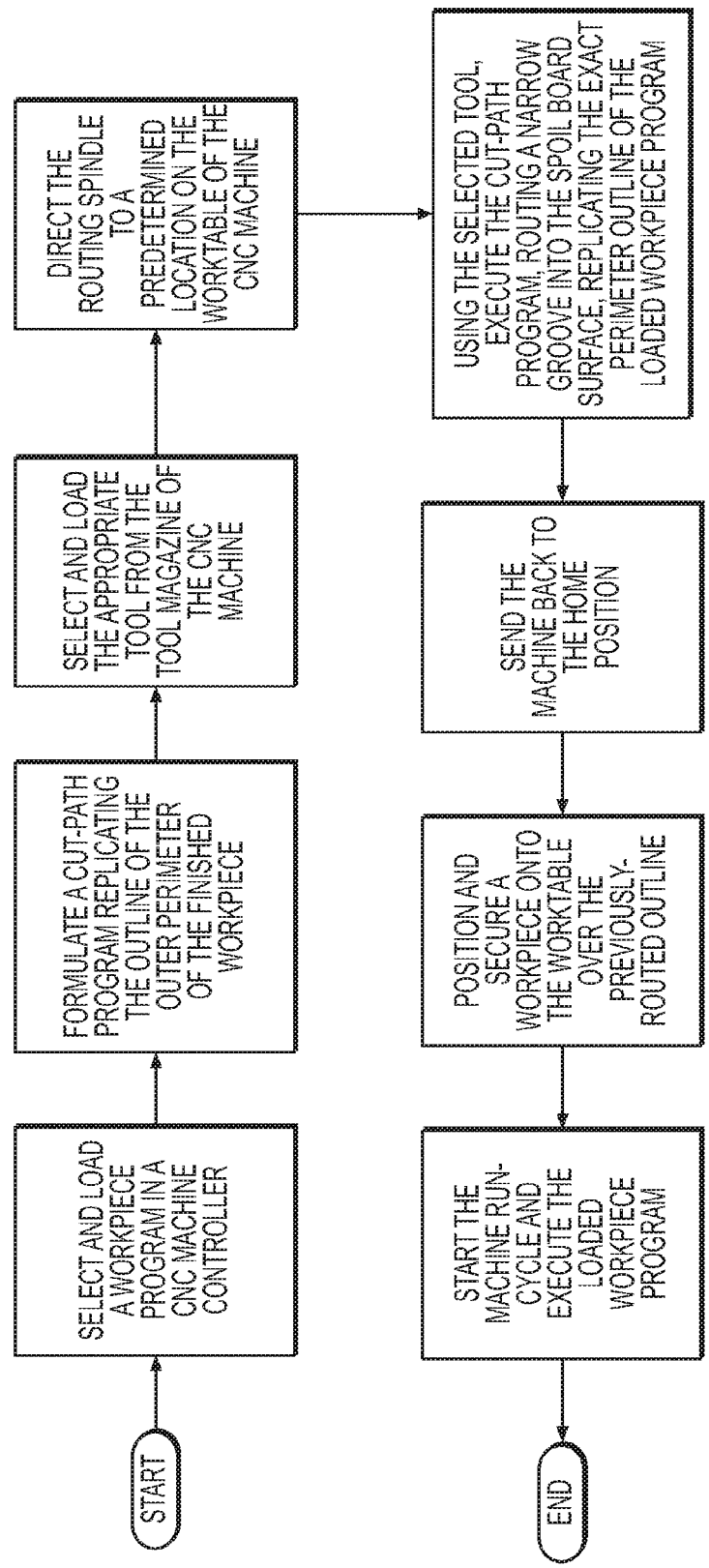
FIG. 2 is a flow diagram of one embodiment of the claimed method.

Referring to the flow diagram shown in FIG. 2, an operator initially would load a selected program as described into the control system of the CNC router 8, and then install a cutting tool (e.g., cutting tool 24) with an appropriate bit into, e.g., a spindle of the tool holder 15. The CNC machine 8 would subsequently be operated in the aforementioned first programmed mode to transfer the cutting tool 24 to a selected location on the worktable 11, penetrate the spoil board 12 to a small depth and guide the cutting tool 24 along, e.g., one or more of the x and y axes to form the grooved outline 30 replicating the base outline of a product to be produced, as illustrated in FIGS. 2 and 3. With the grooved outline 30 having been formed in spoil board 12, the tool holder 15 may be returned to a home position. Once the tool holder 15 has returned to the home position, the operator would load a suitable workpiece 31 on the spoil board 12 with the seating portion thereof positioned atop and preferably extending beyond the confines of grooved outline 30, as shown in FIG. 4. The operator then would operate the CNC machine 8 to actuate a vacuum pump to apply a vacuum to the aforementioned plenum below the spoil board 12, and the interstices of the spoil board 12 within the grooved outline 30, to releasably adhere the positioned workpiece 31 to the spoil board 12. With the workpiece 31 thus securely positioned to the spoil board 12, the operator would mount one or more cutting tools 24 of one or more tool bit configurations in the tool holder 15, and operate the CNC machine 8 in the second programmed mode to move the mounted cutting tool 24 to the location of the workpiece 31 mounted on the spoil board 12. During operation in the second program mode, cutting tool 24 may be guided along the x, y and/or z-axes to configure (e.g., cut or otherwise manipulate) the exposed portion of the workpiece 31 to provide the configuration shown in FIG. 5, for example. Once the cutting tool 24 has completed the cutting process on workpiece 31, the workpiece 31 has now been transformed into a 3D decorative building or furniture item 35, as shown in FIG. 5.

In the selection and mounting of a workpiece 31 on the spoil board 12 to produce a product of intended size and configuration, the workpiece 31 must have a base area sufficient to cover and preferably overlap the area defined by the grooved outline 30. The workpiece must also have a vertical cross-sectional area to accommodate the desired cutting pattern of a tool, and the workpiece must be securely positioned on the spoil board 12 before the CNC machine 8 commences routing or cutting. As alluded to above. the workpiece may be secured to spoil board 12 by means of a vacuum system. Alternatively, workpiece 21 may be secured to spoil board 12 by tape with adhesion on both sides, mechanical fasters, and/or any other suitable means known in the art.

During the manufacture of either small or large quantities of 3D decorative building or furniture item(s) 35, the grooved outline 30 formed in the spoil board 12 may be used repeatedly for the production of multiples of the same decorative item. Once the grooved outline 30 is obscured to the extent that it would not permit the accurate positioning of a workpiece 31 on the spoil board 12, the obscured grooved outline should no longer be used. When the CNC machine 8 is to be used to machine items of different designs requiring different machining programs, the spoil board may be sanded to obliterate any pre-existing grooved outline and permit the formation of another configured outline in the manner previously described. In one embodiment, a new spoil board may be used to cut out a new grooved outline for purposes of manufacturing workpieces of a different configuration.

The described procedure can be performed by personnel of comparatively limited technical background and skill. The CNC machine 8 can be operated by a person having limited technical background and skill in either the operation of CNC machines or methods of manufacturing 3D decorative building and furniture items. Aspects of the present disclosure relate to methods to provide for the suitable programming of the machine, the proper loading and positioning of suitable workpieces on the worktable of the machine, the operation of the machine to provide the groove forming, and machining functions and the removal of the machined workpiece.

While principles of the present disclosure are described herein with reference to illustrative embodiments for particular applications, it should be understood that the disclosure is not limited thereto. Those having ordinary skill in the art and access to the described teachings will recognize additional modifications, applications, embodiments, and substitution of equivalents all fall within the scope of the embodiments described herein. Accordingly, the inventions described herein are not to be considered as limited by the foregoing description.

I claim:

1. A method of forming a three-dimensional component, the method comprising:
    positioning a spoil board on a worktable of a computer numeric control (CNC) machine;
    operating the CNC machine in a first mode to create an outline in the spoil board, wherein the outline defines a perimeter encompassing an area corresponding to a configuration of a surface of a first workpiece, and wherein the outline is a groove formed in the spoil board;
    positioning the first workpiece on the spoil board and over at least a portion of the outline; and
    operating the CNC machine in a second mode to cut into a portion of the first workpiece.

2. The method of claim 1, wherein positioning the first workpiece on the spoil board includes releasably securing the first workpiece to the spoil board.

3. The method of claim 2, wherein the first workpiece is releasably secured to the spoil board by application of a vacuum.

4. The method of claim 1, wherein the worktable includes a plenum, and wherein the spoil board is positioned over the plenum.

5. The method of claim 1, wherein operating the CNC machine in a first mode includes executing a first set of instructions configured to move a first cutting tool relative to the spoil board.

6. The method of claim 5, wherein operating the CNC machine in a second mode includes executing a second set of instructions to move a second cutting tool relative to the first workpiece.

7. The method of claim 6, wherein the first cutting tool has a first cutting profile and the second cutting tool has a second cutting profile, wherein the first cutting profile is different than the second cutting profile.

8. The method of claim 6, wherein the second cutting tool is moved relative to the workpiece in X, Y, and Z directions.

9. The method of claim 1, further comprising:
    removing the first workpiece from the spoil board;
    positioning a second workpiece on the spoil board, wherein the second workpiece is positioned over at least a portion of the outline; and
    operating the CNC machine in the second mode to cut into a portion of the second workpiece.

10. A method of forming a three-dimensional component, the method comprising:
    operating a computer numeric control (CNC) machine in a first mode to cut a first outline in a spoil board positioned on the CNC machine, wherein the first outline is representative of a surface of a first workpiece;
    positioning the first workpiece on the spoil board such that the surface of the first workpiece rests on the spoil board and the first workpiece at least partially overlaps the first outline, wherein an area of the surface of the first workpiece is greater than an area enclosed by the first outline;
    operating the CNC machine in a second mode to cut into the first workpiece; and
    removing the first workpiece and positioning a second workpiece on the spoil board such that the second workpiece at least partially overlaps the first outline.

11. The method of claim 10, further comprising:
    operating the CNC machine in the second mode to cut into the second workpiece.

12. The method of claim 11, further comprising:
    removing the second workpiece from the spoil board;
    removing the first outline from the spoil board;
    operating the CNC machine in a third mode to cut a second outline in the spoil board, wherein the second outline is representative of a surface of a third workpiece, wherein an area of the surface of the third workpiece is greater than an area enclosed by the second outline;

positioning the third workpiece on the spoil board such that the surface of the third workpiece rests on the spoil board and the third workpiece at least partially overlaps the second outline; and operating the CNC machine in a fourth mode to cut into the third workpiece.

13. The method of claim 12, wherein the removing the first outline from the spoil board is accomplished by sanding the spoil board.

14. A method of forming a three-dimensional component, the method comprising:

securing a spoil board to a worktable of a computer numeric control (CNC) machine, the CNC machine comprising a tool holder having a plurality of cutting tools;

operating the CNC machine in a first mode to use a first cutting tool to create a grooved outline in the spoil board, wherein the grooved outline is representative of a surface of a first workpiece;

loading the first workpiece on the spoil board so that the surface of the first workpiece is seated on the spoil board and overlaps the grooved outline in the spoil board, wherein an area of the surface of the first workpiece is larger than an area delineated by the grooved outline;

selecting a second cutting tool;

operating the CNC machine in a second mode using the second cutting tool to cut into a portion of the first workpiece.

15. The method of claim 14, wherein selecting the second cutting tool includes rotating the tool holder.

16. The method of claim 14, wherein loading the first workpiece on the spoil board includes releasably securing the first workpiece to the spoil board.

17. The method of claim 14, wherein the area delineated by the grooved outline is less than an area of the spoil board.

18. The method of claim 14, further comprising:

removing the first workpiece from the spoil board;

removing the spoil board from the worktable;

securing a second spoil board to the worktable of the CNC machine;

operating the CNC machine in a third mode to create a second grooved outline in the second spoil board, wherein the second outline is representative of a surface of a second workpiece;

loading the second workpiece on the second spoil board so that the surface of the second workpiece is seated on the spoil board and overlaps the second grooved outline in the second spoil board, wherein an area of the surface of the second workpiece is larger than an area delineated by the second grooved outline; and operating the CNC machine in a fourth program mode to cut into the second workpiece.

* * * * *